(12) United States Patent
Vassiliou (10) Patent No.: US 6,921,237 B2
(45) Date of Patent: *Jul. 26, 2005

(54) FASTENER HAVING A TAB IN THE CONTACT REGION

(75) Inventor: Eustathios Vassiliou, Newark, DE (US)

(73) Assignee: E. Vassiliou Revocable Trust, Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/318,931

(22) Filed: Dec. 13, 2002

(65) Prior Publication Data

US 2003/0086771 A1 May 8, 2003

Related U.S. Application Data (62) Division of application No. 09/699,760, filed on Oct. 30, 2000, now Pat. No. 6,524,044.
(60) Provisional application No. 60/179,834, filed on Feb. 2, 2000, provisional application No. 60/170,611, filed on Dec. 14, 1999, provisional application No. 60/169,447, filed on Dec. 7, 1999, and provisional application No. 60/167,080, filed on Nov. 23, 1999.

(51) Int. Cl.[7] .................................................. F16B 13/04
(52) U.S. Cl. .......................... 411/55; 411/60.2; 411/61; 411/344
(58) Field of Search ............................ 411/55, 61, 173, 411/182, 508–509, 542, 915, 61.2

(56) References Cited

U.S. PATENT DOCUMENTS

| | | | |
|---|---|---|---|
| 2,720,135 A | | 10/1955 | Gisondi |
| 3,550,499 A | * | 12/1970 | Eilenberger ................... 411/61 |
| 4,500,238 A | | 2/1985 | Vassiliou ...................... 411/30 |
| 4,765,788 A | | 8/1988 | Nowak et al. ................. 411/61 |
| 4,874,277 A | | 10/1989 | Nowak et al. ................. 411/61 |
| 4,941,340 A | | 7/1990 | Nowak et al. ............. 72/379.2 |
| 5,100,273 A | * | 3/1992 | Vassiliou ................... 411/80.1 |
| 5,256,018 A | | 10/1993 | Rattmann et al. ........... 411/175 |
| 5,447,005 A | * | 9/1995 | Giannuzzi ..................... 52/698 |
| 5,725,343 A | * | 3/1998 | Smith ........................... 411/55 |
| 6,280,129 B1 | * | 8/2001 | Lowry et al. ............ 411/173 X |
| 6,299,399 B1 | * | 10/2001 | Smith et al. .............. 411/173 X |
| 6,524,044 B1 | * | 2/2003 | Vassiliou ....................... 411/55 |
| 6,709,210 B2 | * | 3/2004 | Lowry et al. ................. 411/55 |

* cited by examiner

Primary Examiner—Robert J. Sandy
Assistant Examiner—Jeffrey A. Sharp
(74) Attorney, Agent, or Firm—E. Vassiliou (57) ABSTRACT

This invention relates to a fastener, which expands by the insertion of an expanding member, preferably a screw. The fastener comprises a substantially flat head and two expandable legs. The head has an upper side and a lower side, preferably separated by a gap. The head has also a hole on the upper side in which the screw engages. Further, the screw engages in other locations of a critical portion of the rest of the body of the fastener, thereby increasing considerably the prevailing torque required to render the screw loose, the pulling force required to break the fastener or otherwise pull the screw out of the engageable hole of the upper side of the head, as well as the stripping torque.

14 Claims, 5 Drawing Sheets

FIG. 18

FASTENER HAVING A TAB IN THE CONTACT REGION

RELATED APPLICATIONS

This is a Division of application Ser. No. 09/699,760, filed Oct. 30, 2000 now U.S. Pat. No. 6,524,044, which is incorporated herein by reference.

FIELD OF THE INVENTION

This invention pertains fasteners, and more particularly fasteners which attach one object to another and present high prevailing torque and pulling force.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels. Further, such connections are not water-resistant and water may be easily penetrate the connection point and be transferred from one side of one or both objects to the other side.

Recently, fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. The second part of the fastener, being usually a bolt or a screw, supports the second object by forcing the legs of the fastener (as described for example in U.S. Pat. No. 4,500,238) to open or expand, thereby securing the two objects together. The fasteners of this type have greatly improved the prevailing torque (as defined hereinbelow), as well as the pulling force (as also defined hereinbelow) of the system.

U.S. Pat. No. 2,720,135 (Gisondi), and U.S. Pat. No. 5,256,018 (Rattmann et al.) show fasteners of completely different structure than the structure of the fasteners of the instant invention with multiple engagement points. However, the criticality of the crucial positioning of such engagement points is totally non-existent.

Use of tabs at a lower point (further away from the head of the fastener) than the critical range of the present invention, is described in U.S. Pat. No. 5,447,005 (Giannuzzi), regarding an anchor which is intended to be used on hollow walls, plasterboards, etc. Giannuzzi's tabs are engageable elements, but are not positively engageable elements.

In applications where the anchor is intended to be used on hollow walls, it is very important that the legs, after having been expanded by an expansion member, such as a screw, they expand as much as possible, they resist closing upon applying a pulling force on the screw, and it is easy for an operator to screw or unscrew the expansion member (screw). Giannuzzi improves all these properties for the intended end-use of his anchor, by providing a pair of tabs to the legs of the anchor. These tabs are such, however, that when the anchor is in the wall and fully expanded, the anchor forms (column 5, lines 47–54, and FIG. 7 of Giannuzzi's disclosure) "a mechanical truss whose base chords, as shown in FIG. 7, are defined by projecting tabs 15 and 17 pressing into screw 23 and whose side chords are formed by angled blades 12 and 13, the apex of the truss being at head 10". In other words, after the legs of the anchor have been expanded by the screw, and the screw has been engaged also to the tabs, the only points of contact of the screw to the anchor are the hole at the head of the anchor and the tabs. This can only be achieved by designing the tabs to have a high enough length in order to further expand the legs in a manner to disengage the initial contact area of the anchor to the screw, through which the initial expansion of the legs occurred, but still have the tabs short enough to permit their engagement to the screw.

The Giannuzzi design increases the pulling force, and decreases considerably the prevailing torque (the toque needed to screw or unscrew the screw into the anchor). Both these changes may be considered as improvements as far as an anchor intended to be used for supporting items on hollow walls are concerned. It is obvious that the increase in pulling force is a definite asset. It is also obvious that the decrease in prevailing torque is a second asset, since the operator can screw and unscrew the screw with considerably less effort, and further taking into account that hollow walls are steady and do not vibrate to render the screw loose, and therefore a high prevailing torque does not offer any advantages. Indeed, a commercial sample of the type disclosed by Giannuzzi, accepting a #6 sheet-metal screw, was examined, and it was found that it was extremely difficult, if at all possible, to turn the screw manually before the screw was engaged to the tabs, while it was excessively easy to turn the screw manually after the screw was engaged to said tabs.

In contrast to the anchors intended to be used on hollow walls, anchors or fasteners intended to be used in parts which are prone to strong vibrations, such as metal sheets supporting plastic parts for example in vehicles for example, the maintenance of an as high as possible prevailing torque is of utmost importance. An anchor as described by Giannuzzi would have detrimental effects with regard to loosening of screws in the case of end-use in the Automotive Industry, on a vehicle for example. The screw would be loosened considerably more easily when the tabs according to Giannuzzi's teachings were used, than without them. Although the torque required to loosen the screw even further would increase after disengagement from the tabs, this fact would not offer any advantage, since the screw and the part supported by the screw would remain loose anyway.

Since the requirements of the Industry become more and more demanding, fasteners characterized by considerably higher prevailing torque, pulling force, as well as stripping torque than even those disclosed by U.S. Pat. No. 4,500,238 are needed.

One major object of the instant invention is to provide fasteners of highly improved prevailing torque, and/or pulling force, and/or stripping torque without deterioration of any of these properties.

SUMMARY OF THE INVENTION

In the following text, the following comments and definitions are appropriate:

The expanding member is preferably a screw having threads and a root on which the threads are supported.

The presence of the positive engagement increases prevailing torque and/or pulling force, and/or stripping torque, without substantially deteriorating any of these properties, as compared to the same fastener lacking said positive engagement.

Prevailing torque is the torque required to render a screw loose.

Pulling force is the pulling force applied on the screw to the point of failure (usually failure occurs an the bents that join the upper side of the head and the lower side of the head).

Stripping torque is the torque required to strip or overcome the engagement of the expanding body or screw to the fastener.

One engagement is commensurate to another engagement if both co-operate, are substantially well aligned with respect to each other, and have the same effect on the screw.

Roughness based on sand paper having a certain number is the roughness given to steel of Rockwell Hardness 70 in the B scale, when sanded by a sand paper having the certain number.

Engageable hole or region is a hole or region which can be engaged with a screw, or similar element.

Non-engageable hole or region is a hole or region which is not suitable to be engaged with a screw, or similar element.

At least partial hole may be a part of a hole, such as an arc for example. However, the hole does not have to be necessarily round.

This invention pertains fasteners comprising:
(a) a substantially flat head portion having an upper side, and a lower side, the upper side having a first engageable hole, the first engageable hole having a first axis, the first axis being substantially perpendicular to the substantially flat head portion;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through and engaging to the first engageable hole an expansion member, thus bringing the expansion member to a contact region of the legs; and
(d) a funnel configuration in the vicinity of the contact region, the funnel being substantially co-axial with the first engageable hole;
wherein any part of the fastener in the range from the lower side of the head to the contact region, including the lower side of the head and the contact region, constitutes a critical secondary body, and wherein at least one portion of the critical secondary body is positively engageable to the expansion member, when the expansion member is inserted through the first engageable hole.

It is critical that the additional engagement is disposed in the range from the lower side of the head to the contact region, including the lower side of the head and the contact region, because if the additional engagement is disposed at a lower point of the fastener (further away from the head), the engagement observed is unacceptable, due to the superiority of an engagement in the range of the instant invention.

At least one positively engageable portion of the critical secondary body may be disposed at the lower side of the head, and/or it may comprise a second engageable hole.

The lower side of the head may comprise an element selected from a group consisting substantially of a lower side extension, a second engageable hole, and a combination thereof, among other configurations.

The first engageable hole is preferably substantially co-axial with the second engageable hole.

The first engageable hole may be disposed in a first impression on the upper side of the head, the first impression having the same direction as a second impression on the lower side of the head, in which second impression the second engageable at least partial hole is disposed. Alternatively, the first engageable hole may be disposed in a first impression on the upper side of the head, the first impression having an opposite direction as a second impression on the lower side of the head, in which second impression the second engageable at least partial hole is disposed.

The at least one positively engageable portion of the critical secondary body may also be disposed at the opening. In such a case, it preferably comprises at least one rib. More preferably, it comprises at least a pair of ribs, one rib being disposed over each leg.

The at least one positively engageable portion of the critical secondary body may also be disposed at the neck, preferably in the form of threading teeth.

Further, the at least one positively engageable portion of the critical secondary body may be disposed at the funnel. In such a case, the funnel may preferably comprise an element selected from a group substantially consisting of a slit, a groove, a shoulder, a rib, a tab, a surface roughness higher than that of sandpaper # 300, and a combination thereof.

Also, the at least one positively engageable portion of the critical secondary body may be disposed at the contact region. Again, in such a case, the contact region preferably may comprise an element selected from a group substantially consisting of a slit, a groove, a shoulder, a rib, a tab, a surface roughness higher than that of sandpaper # 300, and a combination thereof.

The engagement of the critical secondary body may be at least partially commensurate or at least non-commensurate to the first engageable hole.

The upper side of the head and the lower side of the head of the fastener of the instant invention may be substantially in contact or separated by a gap, depending on the application.

Also, when water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. No. 5,725,343, provisional patent application 60/170,112, filed Dec. 10, 1999, and patent application Ser. No. 09/561,505 filed Apr. 28, 2000, all of which are incorporated herein by reference.

The instant invention also pertains vehicles comprising parts connected with the fasteners described above.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

This invention pertains expanding fasteners which can secure two or more objects together, and are characterized by high prevailing torque, and/or high pulling force, and/or high stripping torque, without deterioration of any of these properties. An example is two automobile parts, such as a plastic panel and a metal sheet, for example, secured together. The invention also pertains vehicles comprising parts connected with the novel fasteners described herein.

Referring now to FIGS. 1 to 4, there is depicted a fastener 10, similar to the fasteners described in U.S. Pat. No. 4,500,238, comprising a substantially flat head portion 12. The substantially flat head portion 12 has an upper side 14, and a lower side 16.

The upper side 14 has a first preferably engageable hole 15, which hole has a first axis X—X. The first axis X—X is substantially perpendicular to the substantially flat head portion 12.

The lower side comprises a right lower side 16a and a left lower side 16b.

Figure 3:
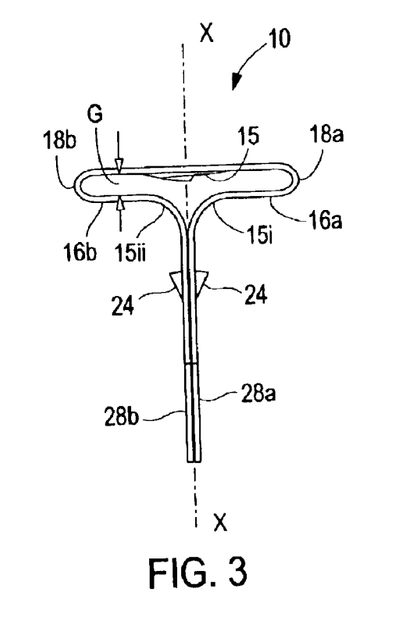
FIG. 3 is a side view of the type of the fastener of FIG. 1.

The upper side 14 and the lower side 16 may be separated by a gap G as better shown in FIG. 3, or they may be substantially in contact (not shown for purposes of clarity) with each other, depending on the application. The upper side 14 is connected to the right lower side 16a and the lower left side 16b through a right head bent 18a and a left head bent 18b, respectively.

The larger the gap G the larger the radius of the two bents, and therefore, the higher the pulling force which is needed to break the hardened fastener at the bent regions. However, there are occasions when a small gap or absence of a gap is necessary due to space requirements. The present invention, as it will be explained later, is even more critical in such occasions.

The fastener 10 further comprises a neck 20 having a cutting or opening 22 and two side neck portions 20a. The neck 20 extends from the lower side 16 of the substantially flat head portion 12 at a substantially right angle in its length with respect to the substantially flat head portion 12 of the fastener 10.

The fastener 10 also comprises two substantially flat legs, a right leg 28a and a left leg 28b, extending from the neck 20, and having inner surfaces 30a and 30b, respectively, the two inner surfaces 30a and 30b of the two legs 28a and 28b being at an initial proximity with each other, the legs being expandable in opposite directions upon inserting through and engaging to the first engageable hole an expansion member, such as screw 26 having threads 27a and a root 27b, thus bringing the expansion member to a contact region 32a on leg 28a and a contact region 32b on leg 28b.

At the bottom of the opening 22 there is disposed a funnel 24 for guiding an expansion member, such as a screw 26 (see FIG. 4), for example. The funnel 24 is preferably coaxial with the hole 15. The funnel 24 may be considered as part of the legs 28a and 28b.

Figure 2:
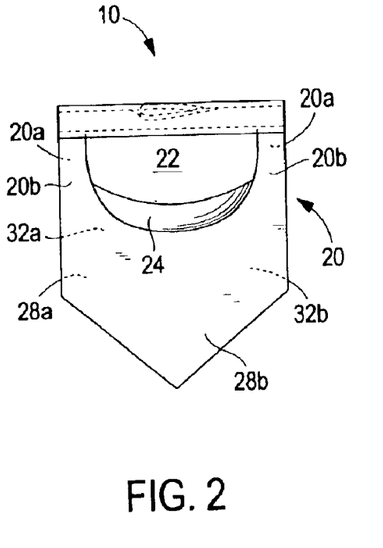
FIG. 2 is a front view of the type of the fastener of FIG. 1.

The opening 22 may have any appropriate dimensions. For example, it may have a general round shape as shown in FIG. 2, or it may be elongated, or it may be just a thin slit parallel to the plane of and adjacent to the substantially flat head portion 12. In the case that it is just a thin slit adjacent to the substantially flat head portion 12, the funnel 24 will also be adjacent to the substantially flat head portion 12, and the two side neck portions 20a will be minuscule in length from the lower side 16 to the beginning of the legs in the vicinity of the funnel 24.

Figure 4:
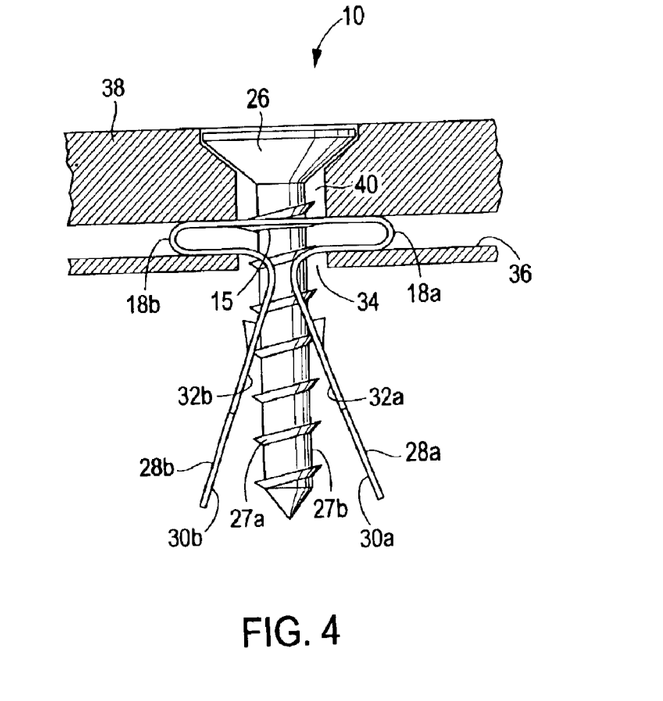
FIG. 4 is a cross-sectional side view of the fastener of FIG. 1 connecting two objects or panels after the legs of the fastener have been expanded by a screw.

In operation, the fastener 10 is inserted through slot 34 of a sheet, preferably metal sheet 36. In sequence, a panel 38 is placed on top having a panel hole 40. An expanding body, preferably a screw, is then inserted through the panel hole 40, engages to the engageable hole 15 of the fastener, and expands the legs 28a and 28b by applying force at the contact region 32a and 32b.

Due to the fact that the expanded legs necessarily apply a squeezing force to the screw 26 at the contact regions 32a and 32b, the torque needed to render the screw loose from its engagement from the hole 15 (prevailing torque) increases, and this is one of the reasons why this type of fastener becomes increasingly popular in the Automotive Industry.

When failing occurs by pulling the screw, it usually occurs at one or both bents 18a and 18b. It can be seen then that the weak point in this arrangement is at the bents 18a and 18b. Nevertheless, the pulling force to reach the failing or break point is still rather high, and this is another good reason why this type of fastener becomes increasingly popular in the Automotive Industry. It is worth noting that if the slot 34 is designed to have a width smaller than the diameter of the threads 27a, then a thread portion is embedded into the sides of the slot, thus increasing the pulling force to some extend by taking some of the load off the upper side 14 of the head 12. However, the increase is not very high since the metal sheet has a considerably lower hardness (usually 70–80 in the Rockwell B scale) as compared to the hardness of the screw or the fastener (usually 40–45 in the Rockwell C scale).

Although the prevailing torque, the pulling force, and the stripping torque characterizing fasteners of the type disclosed in U.S. Pat. No. 4,500,238 are excellent as compared to fasteners of other types, the demands from the Industry are continuously increasing.

It was discovered by the inventor that a unique and critical way to multiply and considerably increase the prevailing torque the pulling force, and the stripping torque is to further provide the fastener with a positive engagement mechanism positioned at one or more points of the fastener in the range from the lower side of the head 16 to the contact region 32, including the lower side of the head 16 and the contact region 32. This part of the fastener 10, constitutes the critical secondary body of the fastener 10.

Figure 4A:
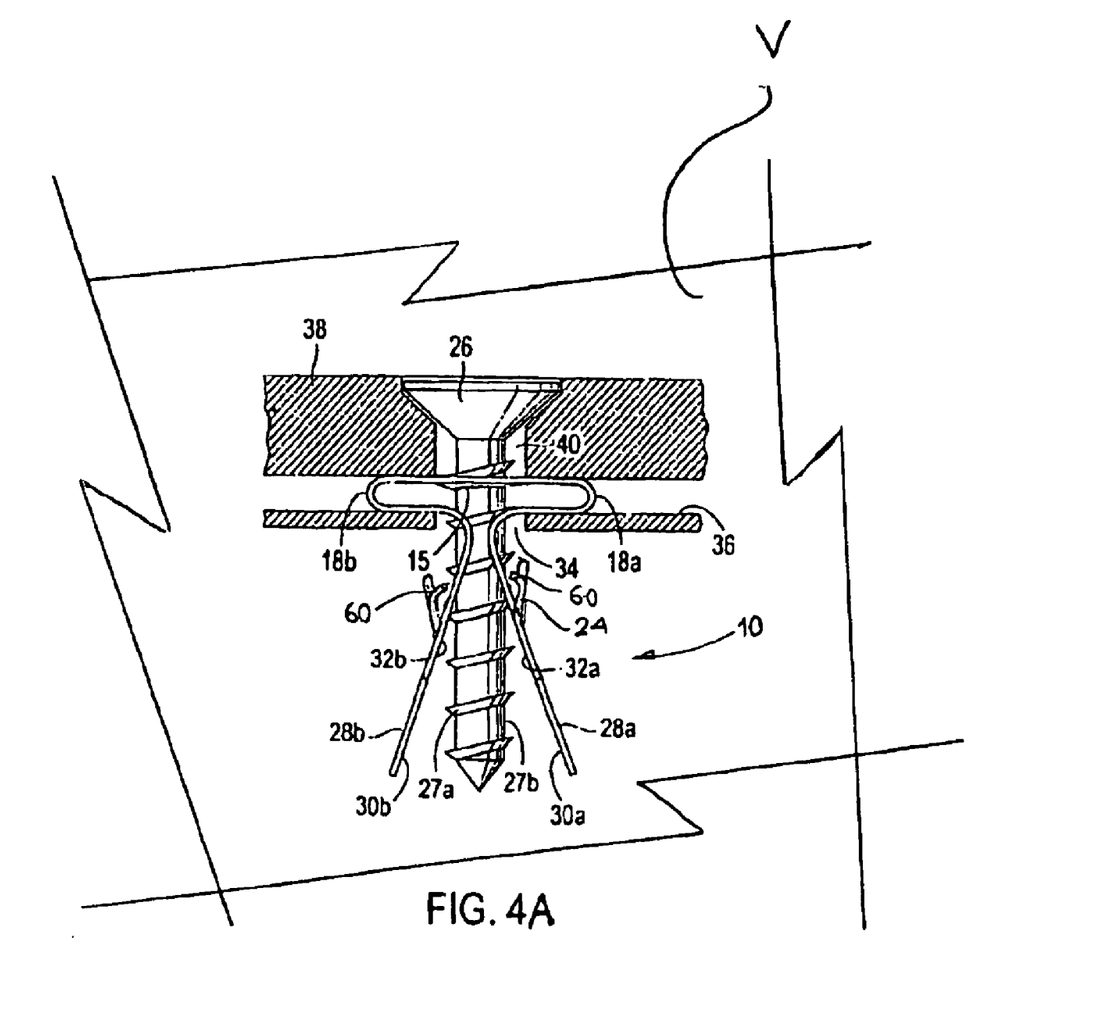
FIG. 4A illustrates a fractional view of vehicle, such as an automobile for example, which comprises a metal sheet and a panel connected with a fastener of the present invention.

FIG. 4A represents a fractional schematic view of a vehicle V, such as an automobile for example, which comprises two objects connected with the fastener of the present invention. In this particular case, one of the objects is a metal sheet 36 connected to a panel 38 with the fastener 10 of the present invention. The fastener 10 comprises a funnel 24 which has a tab 60, also shown in FIG. 14. The operation of this embodiment is similar to the embodiment described above with the major difference that the presence of the positively engageable tab 60 increases considerably the pulling force of the screw 26, without decreasing the prevailing torque or the stripping torque.

Figure 5:
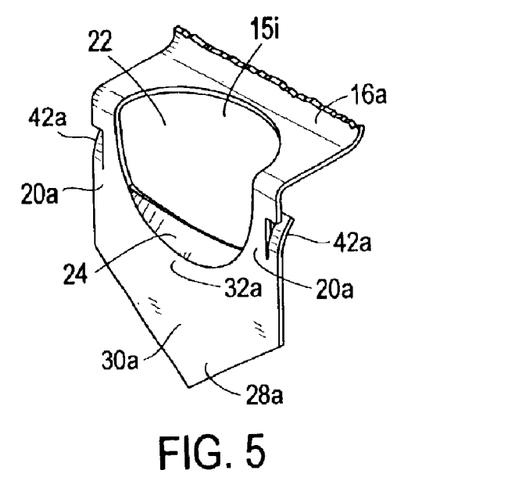
FIG. 5 is a fractional perspective view of the right leg, the side neck portion, and the right lower head side of a fastener as being presently known to the art.

FIG. 5, represents a fractional perspective view of a part of a fastener, as presently known to the art. It consists of the right leg 28 at he neck 20a and the lower side 16a of the head 12 (not shown). Only the fractional right part of the fastener is shown for purposes of clarity in FIG. 5. In these fasteners both right and left side are substantially the same as a mirror image of each other (see FIGS. 1–4). The fasteners of this type, which are presently known to the art, have an opening 22 in the region of the neck. They also have another partial hole 15i in the region of the right lower side 16a. They further have another partial hole 15ii (FIG. 3), similar to the partial hole 15i at the region of the left lower side 16b.

It is very important to note that the two partial holes (15i on the right lower side 16a, and its mirror image 15ii on the left lower side 16b) constitute a hole in the lower side 16 of the head 14. This hole has a considerably higher diameter than the diameter of the engageable hole 15 on the upper side 14 of the head 12 in the present art fasteners, and it is not an engageable hole.

Then, it can be seen easily that the hole produced by the partial holes 15i and 15ii does not interfere at all with the expansion member, preferably screw 26, or its thread 27a, or its root 27b in the case of the present art fasteners. Further, the screw is free to pass through opening 22 without any interference. Finally, the screw 26 expands the two legs 28a and 28b by forcing its thread 27a to slide on the smooth surface of the contact region 32a and 32b.

It is also worth noting that the fasteners of the present art have usually barbs 42a at the sides of the neck 20a, which barbs are intended to hold the fastener into the slot 34 before attaching the panel 38 onto the steel sheet 36 by insertion of the screw 26. When a pulling force is applied on the screw tending to separate the panel 38 from the sheet 36, the barbs tend to hold the critical secondary body of the fastener attached to the sheet 36, and thus, the pulling force is applied almost totally on the upper side 14 of the head 12. Since, under these circumstances, the most vulnerable region are the bents 18a and 18b, failure occurs almost exclusively at that point. This failure is more and more pronounced as the gap G becomes smaller and smaller, while the bents become more and more abrupt.

As aforementioned, one of the major objectives of the instant invention is to increase considerably the pulling force before failure occurs. Another major objective is to increase the torque (prevailing torque) needed to unscrew the expanding member, such as the screw 26, for example. Still another major objective is to increase the stripping torque.

According to the present invention this is achieved by rendering at least one portion of the critical secondary body (the body in the range from the lower side 16 of the head 12 to the contact region 32, including the lower side 16 of the head and the contact region 32) positively engageable to the expansion member, such as screw 26, for example.

Figure 6:
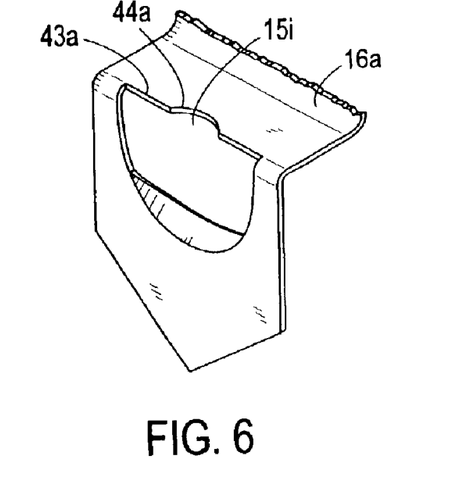
FIG. 6 is a fractional perspective view of the right leg, the side neck portion, and the right lower head side of a fastener according to a preferred embodiment of the instant invention, wherein an engageable portion of the critical secondary body of the fastener is an engageable partial hole.
Figure 7:
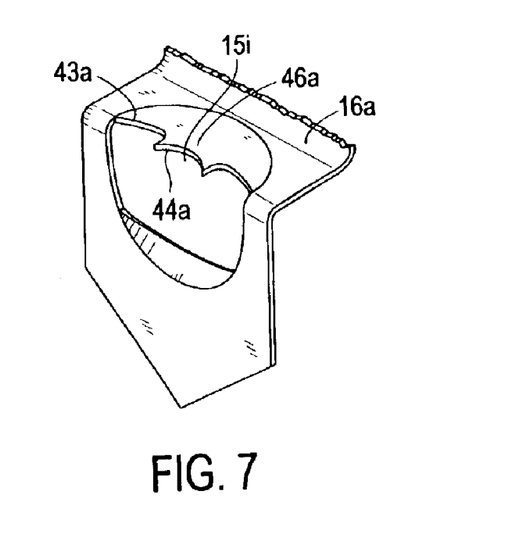
FIG. 7 is a fractional perspective view of the right leg, the side neck portion, and the right lower head side of a fastener according to another preferred embodiment of the instant invention, wherein an engageable portion of the critical secondary body of the fastener is a lower side extension.

In one embodiment of the present invention, better illustrated in FIGS. 6 and 7, the partial hole 15i is made adequately smaller, so that when the screw 26 is inserted into the fastener through hole 15, is also engaged by the right border 43a (which includes a curved portion 44a) of the right lower side 16a, and/or its respective border 43b (not shown in FIGS. 6 and 7) of the left lower side 16b (not shown in FIGS. 6 and 7).

The size of the partial hole 15i can be judged either directly by the root and thread diameters of the screw to be used for expansion, or indirectly by the size of the first engageable hole which corresponds to a screw of a certain size.

It is important to understand that whatever is said about the right part of the fastener, it is equally valid for the left side of the fastener also. It is also important to note that the partial holes and their respective borders may form another at least partial hole, such as partial hole or curved portion 44a, or be linear (lacking the curved portion 44a), or have an extension, such as for example extension 46a, with or without a curved portion 44a. They can also be stamped to be at different levels away from the upper side 14 of the head 12, they may be inclined, they may be commensurate or non-commensurate with the first engageable hole, or they may be in any other configuration, as long as they are positively engageable.

Figure 1:
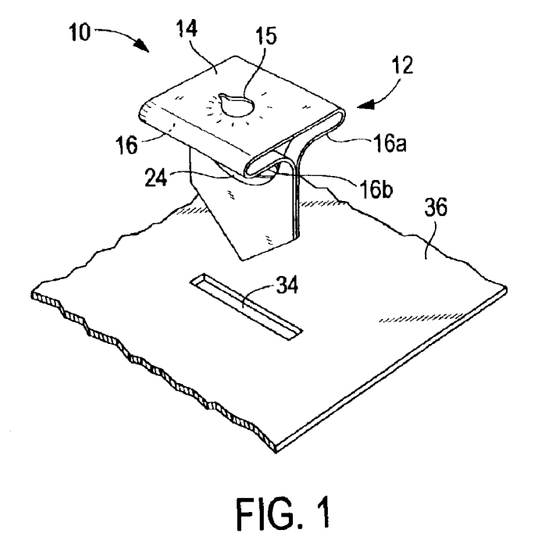
FIG. 1 is a perspective view of a fastener as presently known to the art, and a panel with a slot, on which panel the fastener is intended to fasten another object.

As it can be seen, in FIGS. 1 and 3 for example, the engageable hole 15 is disposed in a cavity or impression. The impression is on the upper side 14 of the head 12, and has a direction toward the lower side 16 of the head 12. This impression, however may have an opposite direction, that is a direction away from both sides 14 and 16, or an upward direction (away from the legs) with regard to the head 12. The same is true for the at least partial engageable hole formed by the partial holes 15i and 15ii according to the present invention, and the direction of the impression in which this at least partial is disposed may be either the same or the opposite than the direction of the impression corresponding to the engageable hole 15.

In operation of this embodiment, as in the case of the known to the art fastener, the fastener 10 of this embodiment is inserted through slot 34 of a sheet, preferably metal sheet 36. In sequence, a panel 38 is placed on top having a panel hole 40. An expanding body, preferably a screw 26, is then inserted through the panel hole 40, engages to the engageable hole 15 of the upper side 14 of the head 12, in sequence engages to the positive engageable portion 44a of the right lower side 16a, and/or its respective counterpart 44b of the left lower side 16b (portion 44a and/or 44b finds itself between two consecutive threads of the screw 26), or to any other positive engageable portion in the lower side 16 of the head 12, and finally expands the legs 28a and 28b in opposite direction by applying force at the contact region 32a and 32b.

Due to the fact that there is engagement at the critical secondary body of the fastener in addition to the engagement at the upper side 14 of the head 12, the pulling force applied for separation of the panel from the sheet is applied to both engagement points. Thus, the pulling force required for failure, especially at the bents 18a and 18b, is increased considerably.

Further, due to the double engagement, the torque required to loosen the screw by turning (prevailing torque) is also increased considerably due to the additional engagement, especially in the case that the engagement at the first engagement hole 15 is not completely commensurate or aligned to the engagement at the right and/or left lower side 16 of the head.

The same applies as far as the stripping torque is concerned.

Figure 8:
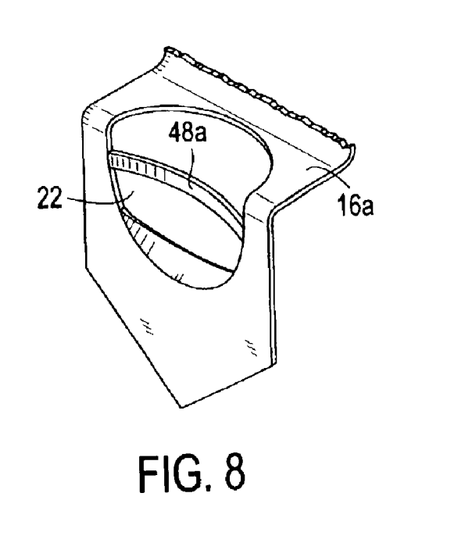
FIG. 8 is a fractional perspective view of the right leg, the side neck portion, and the right lower head side of a fastener according to still another preferred embodiment of the instant invention, wherein an engageable portion of the critical secondary body of the fastener is a rib in the region of the opening.
Figure 9:
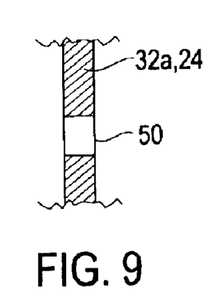
FIG. 9 is a fractional cross-sectional view of part of the contact region or the funnel region with a slit according to other embodiments of the instant invention.
Figure 10:
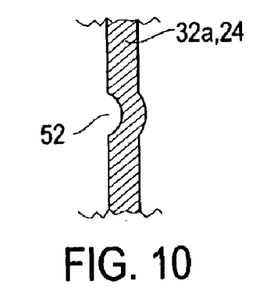
FIG. 10 is a fractional cross-sectional view of part of the contact region or the funnel region with a grove according to other embodiments of the instant invention.
Figure 11:
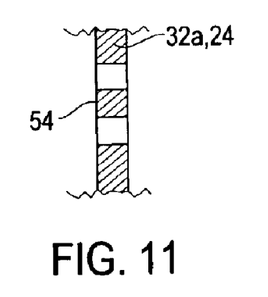
FIG. 11 is a fractional cross-sectional view of part of the contact region or the funnel region with a rib according to other embodiments of the instant invention.
Figure 12:
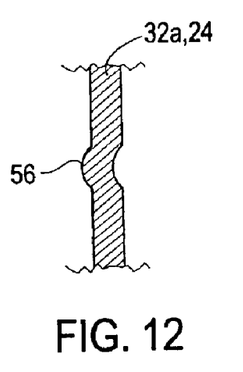
FIG. 12 is a fractional cross-sectional view of part of the contact region or the funnel region with a shoulder according to other embodiments of the instant invention.
Figure 13:
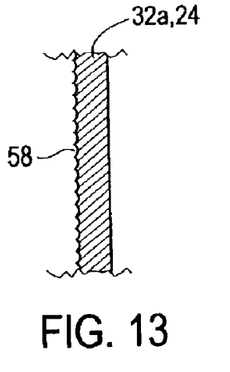
FIG. 13 is a fractional cross-sectional view of part of the contact region or the funnel region with roughness according to other embodiments of the instant invention.

In another embodiment of the instant invention, better illustrated in FIG. 8, there is at least one rib 48a disposed within the opening 22 of the neck 20a. Preferably there is a respective rib 48b within the opening 22 in the region of the respective neck 20b. It is important to note that if the width of the slot 34 is rather tight with respect to the fastener of the present invention, the rib(s) 48a and/or 48b may be forced to be embedded to the sides of the slot 34 when the screw is inserted, thus reinforcing even further the engagement strength of this novel structure.

The operation of this embodiment is similar to the operation of the previous embodiment with the difference that after the hole engages to the first engageable hole 15, engages to the rib 48a and/or 48b, instead of the right side 16a and/or left lower side 16b of the head 12.

Figure 14:
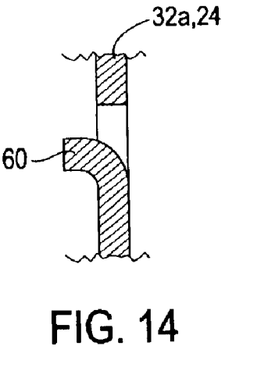
FIG. 14 is a fractional cross-sectional view of part of the contact region or the funnel region with a tab according to other embodiments of the instant invention.
Figure 15:
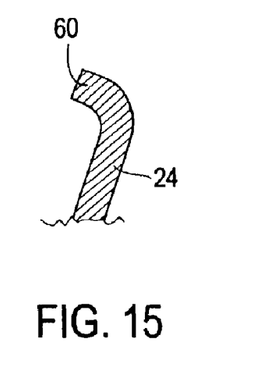
FIG. 15 is a fractional cross-sectional view of part of the funnel region with a tab at the edge of said funnel region according to another embodiment of the instant invention.
Figure 17:
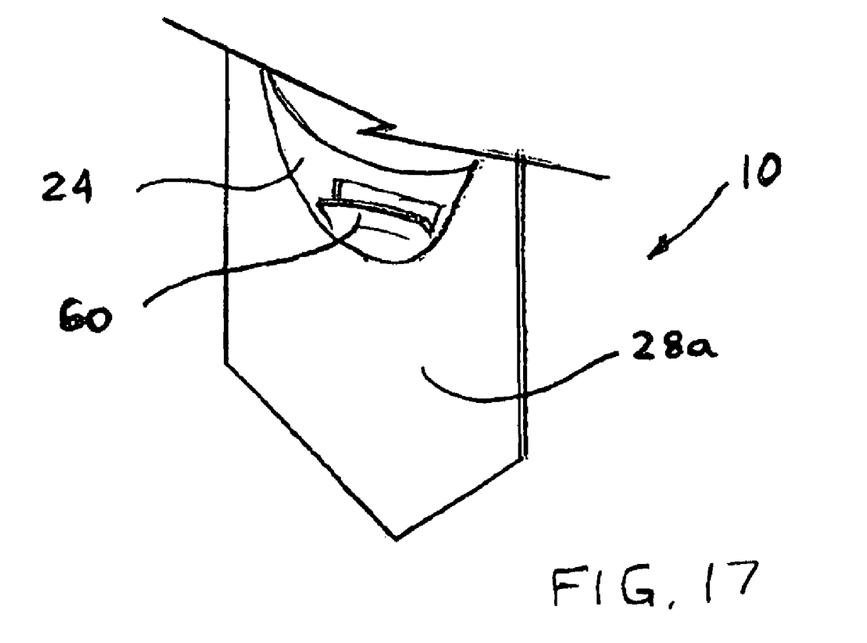
FIG. 17 is a fragmental perspective view of the right portion of the fastener according to another embodiment of this invention, wherein the funnel is provided with a tab.

In still other embodiments of the instant invention, better illustrated in FIGS. 9–13, the contact region 32a or the funnel region 24 is provided with slit(s) 50 (FIG. 9), and/or groove(s) 52 (FIG. 10), and/or rib(s) 54 (FIG. 11), and/or shoulder(s) 56 (FIG. 12), and/or surface 58 having a roughness greater than that of sandpaper # 300, and preferably greater than that of sandpaper #100 (FIG. 13), and/or tab(s) 60 (FIGS. 14 and 17). Of course, preferably, the respective contact region 32b has similar elements or combination of elements. The funnel region 24 may provide a tab 60 at its edge, as better shown in FIG. 15.

The operation of these embodiments is similar to the operation of the previous embodiment with the difference that the position of the additional engagement in the critical secondary body is in the contact region or in the funnel region.

Figure 16:
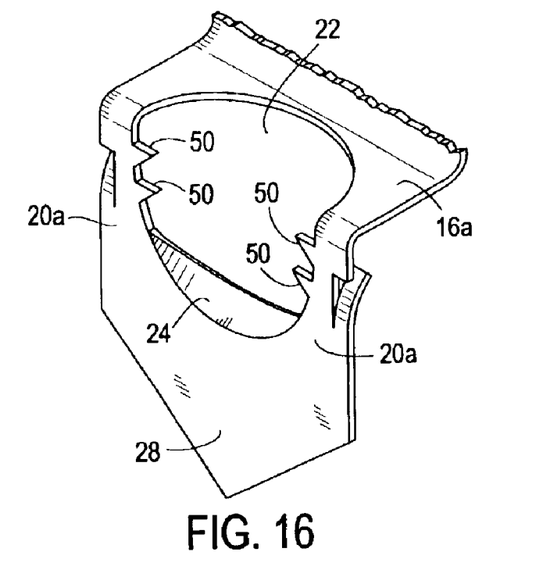
FIG. 16 is a fractional perspective view of the right portion of the fastener according to another embodiment of this invention, wherein the neck is provided with threading teeth.

In another embodiment of the present invention, better shown in FIG. 16, the neck region 26a (and the respective neck region 26b, which is not shown) may comprise threading teeth 50. The threading teeth 50 are preferably bent outwardly (away from the plane of the legs 28) for easy engagement with the expanding member (screw for example). The location of the threading teeth 50 is preferably such as to correspond to the pitch of the screw (not shown).

One or more of the above embodiments may be exercised simultaneously.

It should be noted that by far the most effective embodiment of this invention is the one based on the additional engagement disposed at the lower side 16 of the head 12. This criticality may be due to the fact that in this particular case both engagements (on the upper side 14 and the lower side 16) are disposed on top of the article 36 on which the fastener is anchored.

When water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. No. 5,725,343, provisional patent application No. 60/170,112, filed Dec. 10, 1999, and patent application Ser. No. 09/561,505 filed Apr. 28, 2000, all of which are incorporated herein by reference.

Figure 18:
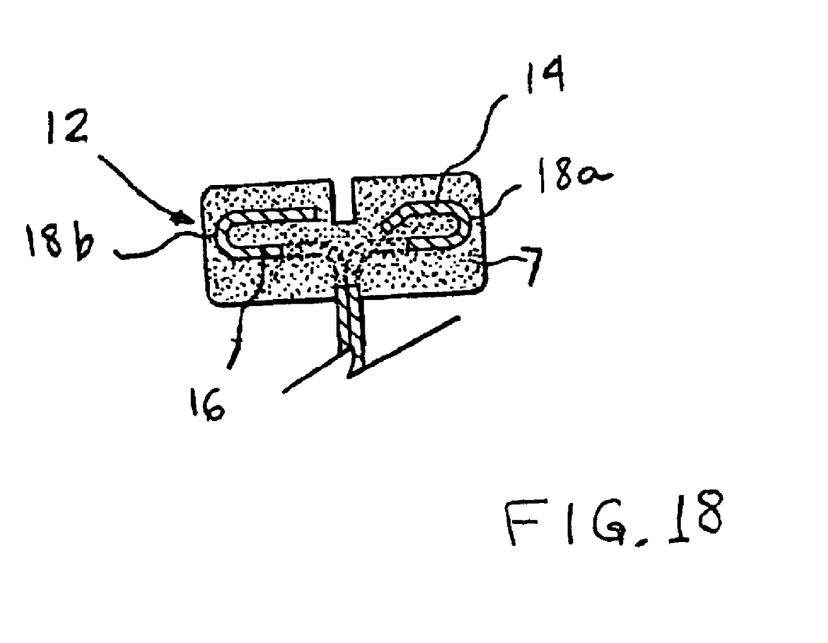
FIG. 18 is a fragmental cross-sectional view of the fastener according to another embodiment of this invention, wherein an elastic body is integrally molded at least at the lower side of the substantially flat head portion of the fastener.

An example of an elastic body 7, according to this embodiment, is better illustrated in FIG. 18.

The embodiments described hereinabove serve illustration purposes only regarding this invention, which should only be bound by the claims.

Any explanations given are speculative and should not restrict the scope of the claims.

What is claimed is:

1. A fastener comprising:
   (a) a substantially flat head portion having an upper side, and a lower side, the upper side having a first engageable hole, the first engageable hole having a first axis, the first axis being substantially perpendicular to the substantially flat head portion;
   (b) a neck having an opening and two side neck portions, the neck extending from the lower side of the substantially flat head portion at a substantially right angle with respect to the substantially flat head portion;
   (c) two substantially flat legs extending from the neck, each leg having an inner surface, the two inner surfaces of the two legs being at an initial proximity with each other, the legs being expandable in opposite directions upon inserting through and engaging to the first engageable hole an expansion member, thus bringing the expansion member to a contact region of the legs; and (d) a funnel in the vicinity of the contact region, the funnel being substantially curved and substantially co-axial with the first engageable hole;

wherein the funnel comprises a positively engageable tab extending from said substantially curved funnel in a direction toward the head.

2. A fastener as defined in claim 1, wherein an additional positively engageable portion is disposed under the lower side of the head.

3. A fastener as defined in claim 1, wherein an additional positively engageable portion is disposed at the opening.

4. A fastener as defined in claim 3, wherein a rib is disposed at the opening.

5. A fastener comprising:
(a) a substantially flat head portion having an upper side, and a lower side, the upper side having a first engageable hole, the first engageable hole having a first axis, the first axis being substantially perpendicular to the substantially flat head portion;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through and engaging to the first engageable hole an expansion member, thus bringing the expansion member to a contact region of the legs; and
(d) a funnel in the vicinity of the contact region, the funnel being substantially curved and substantially co-axial with the first engageable hole;
wherein the funnel comprises a tab extending from said substantially curved funnel in a direction toward the head, a positively engageable portion is disposed at the neck.

6. A fastener comprising:
(a) a substantially flat head portion having an upper side, and a lower side, the upper side having a first engageable hole, the first engageable hole having a first axis, the first axis being substantially perpendicular to the substantially flat head portion;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through and engaging to the first engageable hole an expansion member, thus bringing the expansion member to a contact region of the legs; and
(d) a funnel in the vicinity of the contact region, the funnel being substantially curved and substantially co-axial with the first engageable hole;
wherein the funnel comprises a tab extending from said substantially curved funnel in a direction toward the head, and the neck comprises threading teeth.

7. A fastener comprising:
(a) a substantially flat head portion having an upper side, and a lower side, the upper side having a first engageable hole, the first engageable hole having a first axis, the first axis being substantially perpendicular to the substantially flat head portion;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through and engaging to the first engageable hole an expansion member, thus bringing the expansion member to a contact region of the legs; and
(d) a funnel in the vicinity of the contact region, the funnel being substantially curved and substantially co-axial with the first engageable hole;
wherein the funnel comprises a positively engageable tab extending from said substantially curved funnel in a direction toward the head, tab, and wherein an elastic body is integrally molded at least at the lower side of the substantially flat head portion.

8. A vehicle comprising two parts connected with a fastener, the fastener comprising:
(a) a substantially flat head portion having an upper side, and a lower side, the upper side having a first engageable hole, the first engageable hole having a first axis, the first axis being substantially perpendicular to the substantially flat head portion;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through and engaging to the first engageable hole an expansion member, thus bringing the expansion member to a contact region of the legs; and
(d) a funnel in the vicinity of the contact region, the funnel being substantially curved and substantially co-axial with the first engageable hole;
wherein the funnel comprises a positively engageable tab extending from said substantially curved funnel in a direction toward the head.

9. A vehicle as defined in claim 8, wherein an additional positively engageable portion is disposed under the lower side of the head of the fastener.

10. A vehicle as defined in claim 8, wherein an additional positively engageable portion of the fastener is disposed at the opening.

11. A vehicle as defined in claim 10, wherein a rib is disposed at the opening.

12. A vehicle as defined in claim 8, wherein an additional positively engageable portion is disposed at the neck of the fastener.

13. A vehicle as defined in claim 8, wherein the neck of the fastener comprises threading teeth.

14. A vehicle as defined in claim 8, wherein an elastic body is integrally molded at least at the lower side of the substantially flat head portion of the fastener.

* * * * *